(12) United States Patent
Gettig et al.

(10) Patent No.: US 11,225,293 B2
(45) Date of Patent: Jan. 18, 2022

(54) LIFT APPARATUS WITH BEARING RETAINER

(71) Applicant: DEERE & COMPANY, Moline, IL (US)

(72) Inventors: Blake C. Gettig, Thibodaux, LA (US); Jason R. Dehnke, Thibodaux, LA (US); Chirag Sheth, Pune (IN); Vinodkumar Tangudu, Thibodaux, LA (US); Suyash Sidhaye, Mentone (AU)

(73) Assignee: Deere & Company, Moline, IL (US)

( * ) Notice: Subject to any disclaimer, the term of this patent is extended or adjusted under 35 U.S.C. 154(b) by 431 days.

(21) Appl. No.: 16/243,859

(22) Filed: Jan. 9, 2019

(65) Prior Publication Data

US 2020/0216123 A1 Jul. 9, 2020

(51) Int. Cl.
| | |
|---|---|
| *B62D 55/116* | (2006.01) |
| *B62D 55/084* | (2006.01) |
| *B62D 55/06* | (2006.01) |
| *A01D 45/10* | (2006.01) |
| *B62D 55/10* | (2006.01) |
| *A01D 34/74* | (2006.01) |
| *F16C 35/06* | (2006.01) |
| *B62D 33/10* | (2006.01) |

(Continued)

(52) U.S. Cl.
CPC ............ *B62D 55/084* (2013.01); *A01D 34/74* (2013.01); *A01D 45/10* (2013.01); *B60G 17/00* (2013.01); *B62D 33/10* (2013.01); *B62D 55/06* (2013.01); *B62D 55/10* (2013.01); *B62D 55/116* (2013.01); *F16C 35/06* (2013.01); *A01D 34/54* (2013.01)

(58) Field of Classification Search
CPC ........ B60G 17/00; B62D 33/10; B62D 55/06; B62D 55/116; B62D 55/10; B60S 9/04; F16C 35/06
See application file for complete search history.

(56) References Cited

U.S. PATENT DOCUMENTS 2,136,155 A * 11/1938 Spicacci .................. F16C 35/06
384/539
2,536,784 A * 1/1951 Tamm ................... H02K 5/1732
384/465

(Continued)

OTHER PUBLICATIONS

Unimil Cylinder Suspension Kit Information (1 page) (prior art at least as of May 24, 2018).

(Continued)

*Primary Examiner* — Frank B Vanaman (57) ABSTRACT

A lift apparatus is provided for use with a vehicle comprising a first frame and a second frame. The lift apparatus comprises a spindle, a bearing, a cylinder, a snap ring, and a bearing retainer. The spindle is configured to be attached to the second frame so as to extend therefrom in spaced apart relation to the first frame. The bearing is positioned on the spindle. The cylinder is configured to be attached to the first frame and is attached to the second frame to move the first frame relative to the second frame. The cylinder is positioned on the bearing such that the bearing enables movement between the spindle and the cylinder. The snap ring is attached to the spindle. The bearing retainer is positioned on the spindle between the snap ring, and the bearing retains the bearing on the spindle.

17 Claims, 6 Drawing Sheets

(51) Int. Cl.
*B60G 17/00* (2006.01)
*A01D 34/54* (2006.01)

(56) References Cited

U.S. PATENT DOCUMENTS

| | | | | |
|---|---|---|---|---|
| 3,680,935 | A * | 8/1972 | Wurzel | F16C 35/06 384/563 |
| 4,972,291 | A * | 11/1990 | Cunningham | H01T 1/00 174/166 R |
| 5,390,752 | A * | 2/1995 | Urbanczyk | B62D 55/116 180/41 |
| 5,873,287 | A * | 2/1999 | Kawada | A01D 34/69 74/606 R |
| 2005/0281611 | A1* | 12/2005 | Matczak | F16C 11/0666 403/122 |
| 2008/0152458 | A1* | 6/2008 | Bauer | F16B 43/003 411/369 |
| 2017/0087949 | A1* | 3/2017 | Lindsay | B60G 9/003 |

OTHER PUBLICATIONS

Alta Paulista Cane Harvester Suspension Axle information (1 page) (prior art at least as of May 24, 2018).
SKF Radial Spherical Plain Bearing Information (1 page) (prior art at least as of Jul. 27, 2018).
Information on Lift Apparatus With Spindle Assembly Having Bolted Joint (3 pages) (prior art at least as of May 24, 2018).

* cited by examiner

FIG. 6

LIFT APPARATUS WITH BEARING RETAINER

FIELD OF THE DISCLOSURE

The present disclosure relates to a lift apparatus, in particular, a lift apparatus for use in raising and lowering a first frame of a vehicle relative to a second frame of the vehicle.

BACKGROUND OF THE DISCLOSURE

A sugarcane harvester comprises a base machine for harvesting sugarcane and a number of ground-engaging elements for propelling the harvester. The ground-engagement elements may be, for example, tracks, with one or more tracks on each side of the vehicle. A lift cylinder is positioned on either side of the harvester to interconnect the main frame of the base machine and a track frame of a respective track to raise and lower the main frame relative to the track frame to change the height of a basecutter of the base machine relative to the ground. A spindle is mounted to the track frame. The cylinder is attached to the spindle via a bearing. A bolted joint has been used to retain the cylinder and the bearing on the spindle.

SUMMARY OF THE DISCLOSURE

A lift apparatus is provided for use with a vehicle comprising a first frame and a second frame. The lift apparatus comprises a spindle, a bearing, a cylinder, a snap ring, and a bearing retainer. The spindle is configured to be attached to the second frame so as to extend therefrom in spaced apart relation to the first frame. The bearing is positioned on the spindle. The cylinder is configured to be attached to the first frame and is attached to the second frame to raise and lower the first frame relative to the second frame. The cylinder is positioned on the bearing such that the bearing enables movement between the spindle and the cylinder. The snap ring is attached to the spindle. The bearing retainer is positioned on the spindle between the snap ring and the bearing such that the snap ring retains the bearing retainer on the spindle and the bearing retainer retains the bearing on the spindle. The snap ring is nested in the bearing retainer.

The above and other features will become apparent from the following description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
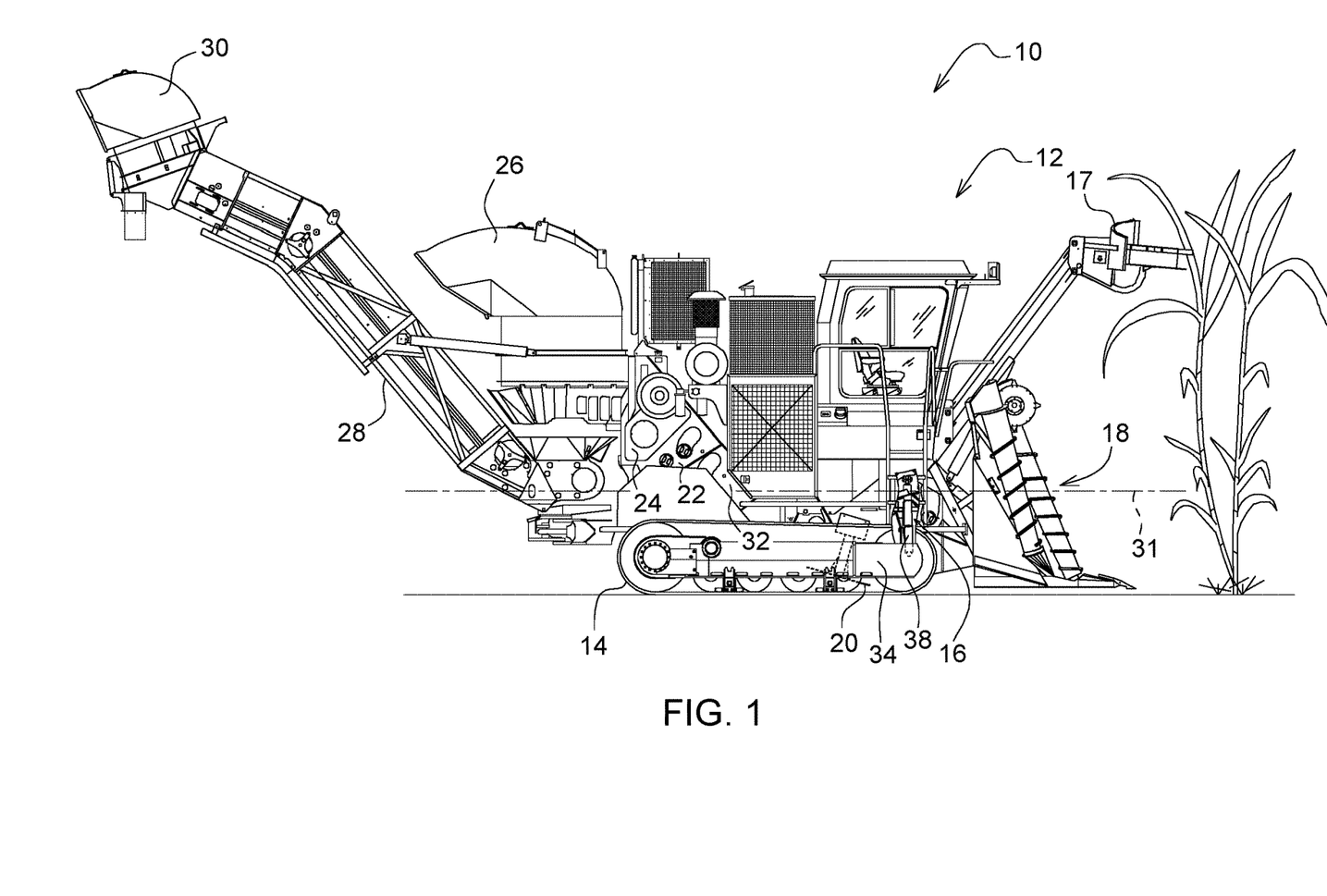
FIG. 1 is a side elevational view showing a vehicle in the form of, for example, a sugarcane harvester.

Referring to FIG. 1, a vehicle 10 comprises a base machine 12, a pair of ground-engaging elements 14 that are attached to the base machine 12 in a suitable manner and engage the ground to propel the vehicle 10 along the ground, and a pair of lift apparatus 16 configured to adjust a height of at least a portion of the base machine 12 relative to the elements 14. The ground-engaging elements 14 may be a pair of tracks, in which case the vehicle 10 may have a track and a lift apparatus 16 on each side of the vehicle 10 such that the lift apparatus 16 interconnects the base machine 12 and the track. As an example, the vehicle 10 is described as a sugarcane harvester, although it is to be understood that the vehicle 10 may be configured in a wide variety of ways so as to take a wide variety of forms.

In the example of a sugarcane harvester with tracks as its ground-engaging elements 14, the vehicle 10 comprises, for example, a topper 17, a left and a right crop divider 18, an upper and a lower knockdown roller (the knockdown rollers not shown), a basecutter 20, a feed section 22, a chopping section 24, a primary extractor 26, an elevator 28, and, in some embodiments, a secondary extractor 30. The topper 17 is configured to cut off the leafy tops of the sugarcane. The left and right crop dividers 18 are configured to lift sugarcane for feeding into the throat of the harvester. The basecutter 20 comprises a left cutting disk and a right cutting disk (only the right cutting disk being shown). The left and right cutting disks cooperate with one another to sever the stalk of sugarcane knocked down by the knockdown rollers at a location near the ground. The feed section 22 is configured to receive from the basecutter 20 a mat of severed sugarcane and to feed the mat rearwardly. The chopping section 24 is configured to receive the mat from the feed section 22 and cut the sugarcane stalk into billets. The primary extractor 26 is positioned downstream from the chopping section 24 and is configured to separate crop residue (e.g., leafy material) from the billets and remove the crop residue from the vehicle 10. The elevator 28 is positioned at the rear of the vehicle 10 to receive the cleaned flow of billets and is configured to convey the billets to an elevated position where they are discharged into a wagon to be hauled away. The secondary extractor 30 (if present) is positioned near the top of the elevator 28 and is configured to further separate crop residue from the billets and remove the crop residue from the vehicle 10. The vehicle 10 has a fore-aft axis 31, with terms terms such as "lateral" and "laterally" being relative to the fore-aft axis.

Figure 2:
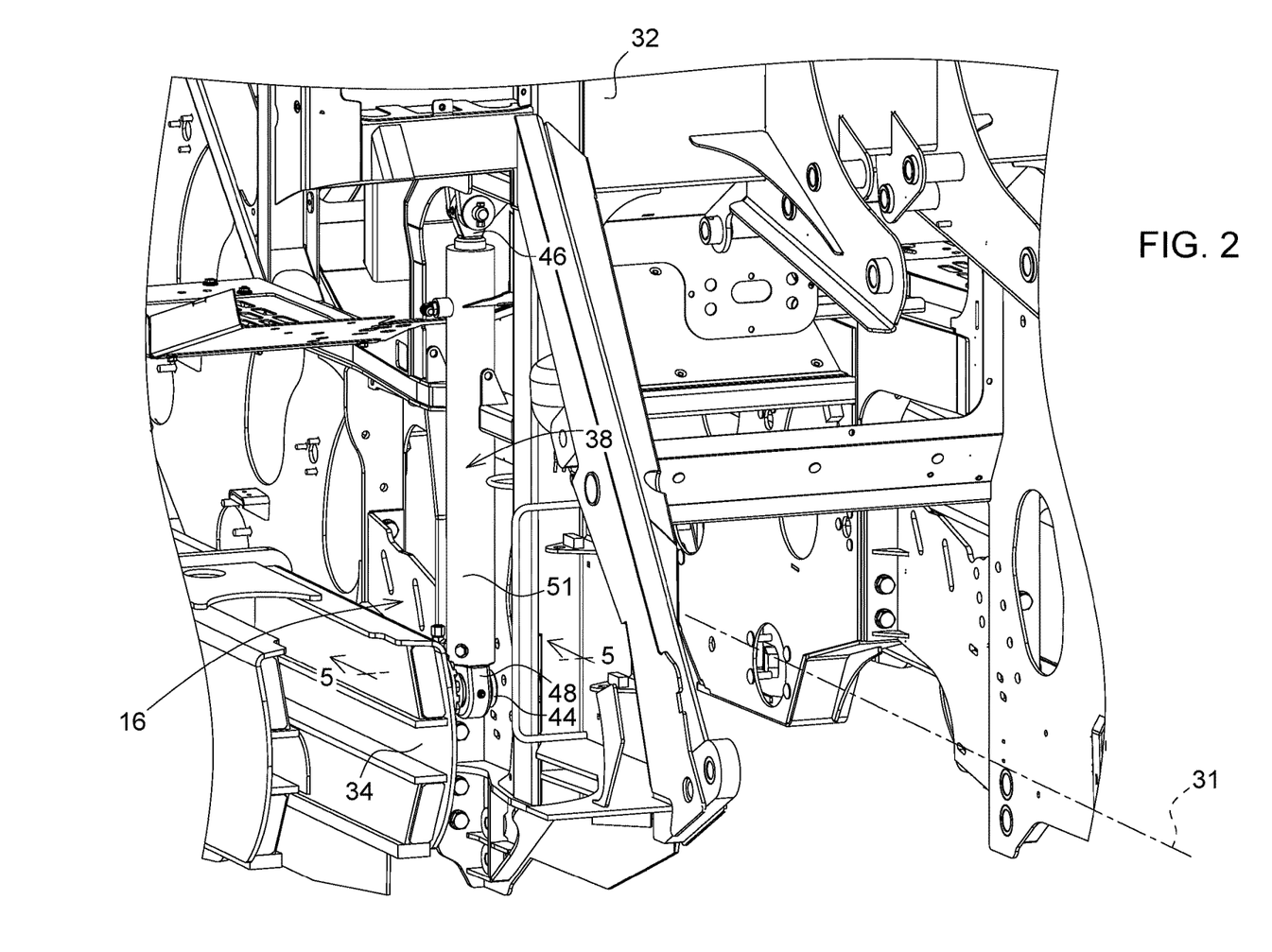
FIG. 2 is a perspective view showing a lift cylinder attached to a first frame (e.g., a main frame of the sugarcane harvester) and a second frame (e.g., a track frame of a track of the sugarcane harvester) to raise and lower the first frame relative to the second frame.

Referring to FIG. 2, each lift apparatus 16 is configured to adjust the height of the basecutter 20 relative to a respective element 14 in the form of, for example, a track, and thus relative to the ground. The lift apparatus 16 is attached to a first frame 32 of the base machine 12 and a second frame 34 of the element 14. Illustratively, the first frame 32 is a main frame of the base machine 12, and the second frame 34 is a track frame of the track. In such a case, the second frame 34 is attached to the first frame 32 in a suitable manner. The basecutter 20 is attached to the first frame 32 so as to be mounted thereto such that operation of the lift apparatus 16 adjusts the height of the basecutter 20 relative to the element 14 and the ground. The topper 17, crop dividers 18, the feed section 22, the chopping section 24, the primary extractor 26, the elevator 28, and the secondary extractor 30 (if present) are also attached to the first frame 32 so as to be mounted thereto.

Figure 3:
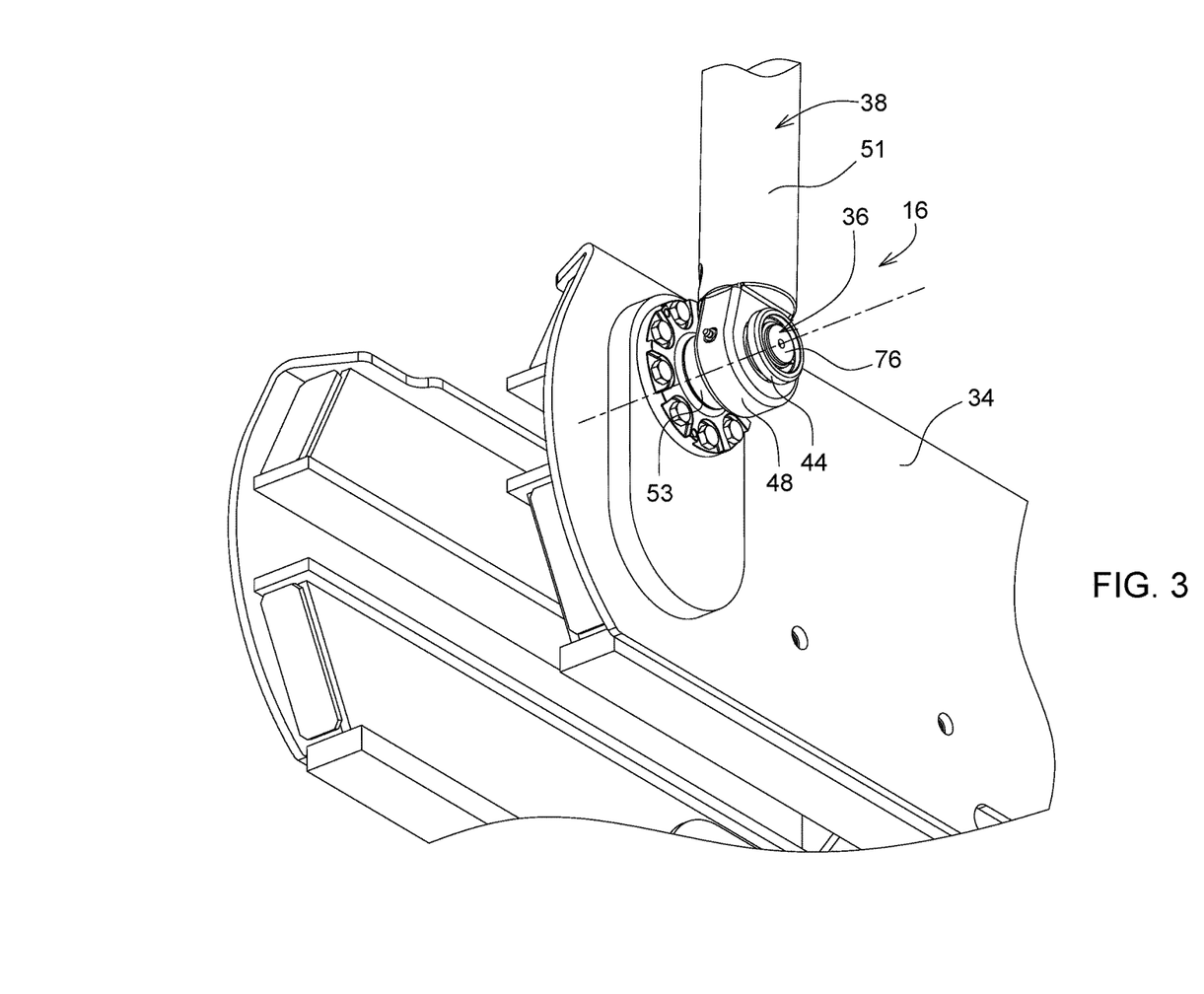
FIG. 3 is a perspective view showing the lift cylinder attached to a spindle mounted to the second frame.
Figure 4:
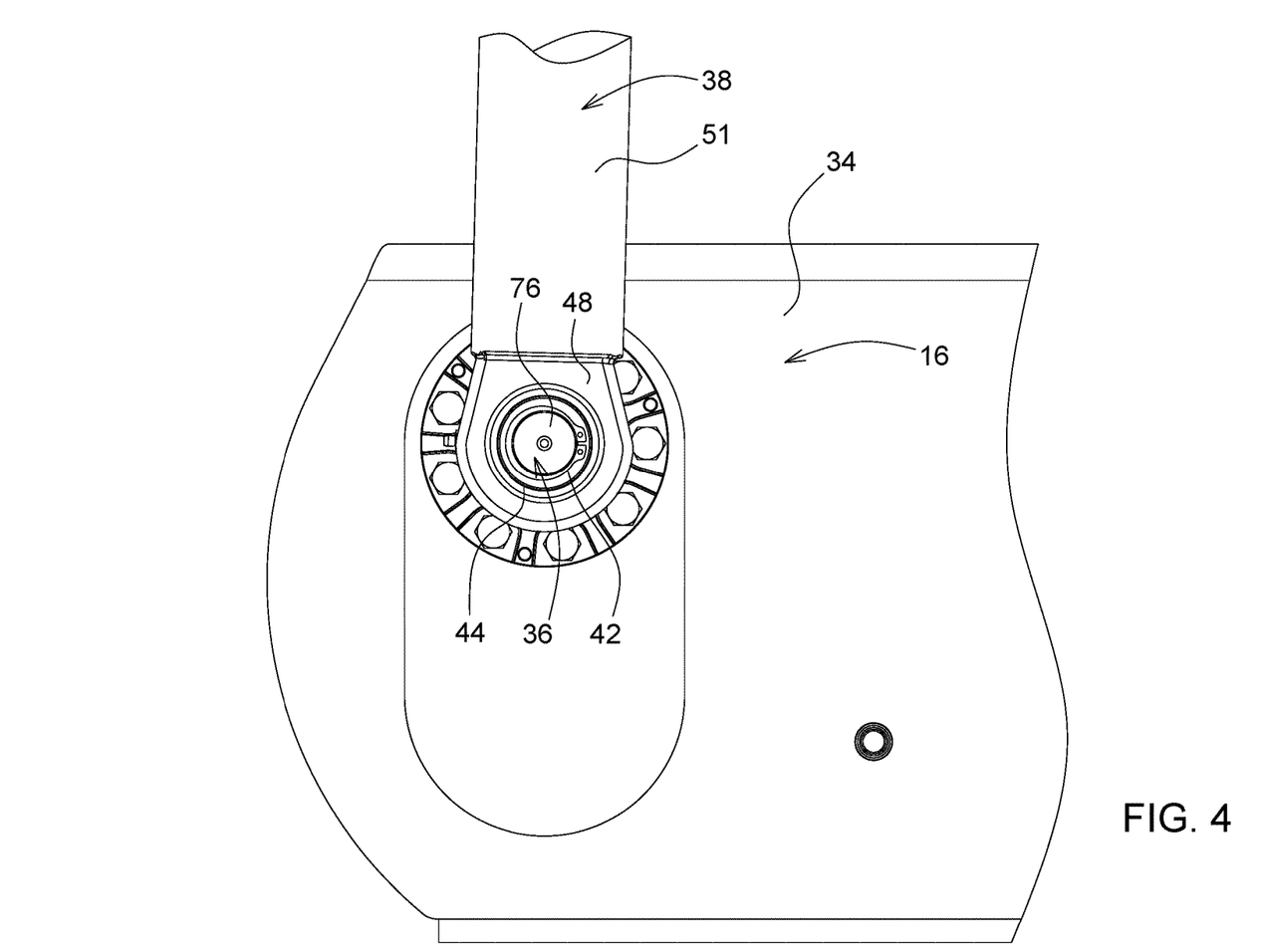
FIG. 4 is an elevational view showing the cylinder attached to the spindle.
Figure 5:
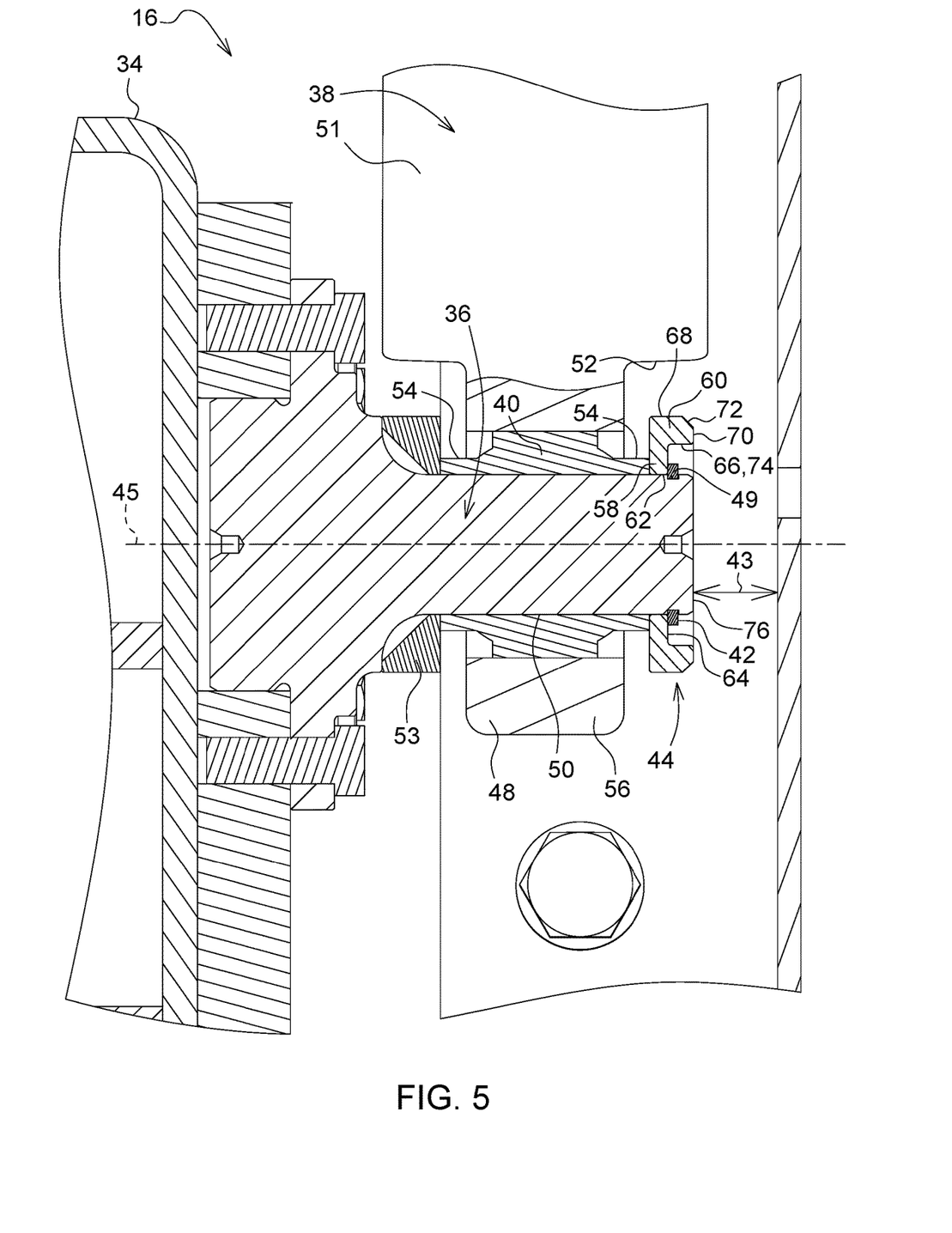
FIG. 5 is a sectional view, taken along lines 5-5 of FIG. 2, showing the cylinder attached to the spindle via a bearing and a bearing retainer positioned on the spindle between a snap ring and the bearing such that the snap ring retains the bearing retainer on the spindle and the bearing retainer retains the bearing on the spindle.

Referring to FIGS. 3-5, the lift apparatus 16 comprises a spindle 36, a lift cylinder 38, a bearing 40, a snap ring 42, and a bearing retainer 44. The spindle has an axis 45, with terms such as "axial," "axially," "radial," and "radially" being relative to the spindle axis 45. The spindle 36 is configured to be attached to the second frame 34 so as to extend axially and laterally therefrom in spaced apart relation to the first frame 32 by a gap 43. The spindle 36 is mounted to the second frame 34 with a plurality of mounting bolts fastening a flange of the spindle 36 to a laterally inner wall of the second frame 34 (threads are present but not shown for ease of illustration). The spindle 36 extends laterally inwardly and axially from the track frame 34 toward the first frame 32, with the laterally inner end of the spindle 36 positioned in spaced apart relation to the first frame 32 by the gap 43. Such spacing between the spindle 36 and the first frame 32 provides a clearance between the spindle 36 and the first frame 32, aiding in installation and removal of components (e.g., spindle 36, mounting bolts, cylinder 38, bearing 40, snap ring 42, bearing retainer 44, and collar 53) during service of the second frame 34 and reducing the likelihood of contact between the spindle 36 and the first frame 32.

The cylinder 38 is attached to the first frame 32 and the second frame 34 to raise and lower the first frame 32 and the basecutter 20 relative to the second frame 34 and the ground, to change the height of the basecutter 20 relative to the ground. The cylinder 38 is configured to be attached to the first frame 32 via an upper end 46 of the cylinder 38, and to the second frame 34 via a lower end 48 of the cylinder 38. The upper and lower ends 46, 48 of the cylinder 38 are respectively attached to the first and second frames 32, 34.

The bearing 40 is positioned on the spindle 36 therearound. The bearing 40 is positioned on the spindle 36 via, for example, a locational clearance fit. The cylinder 38 is positioned on the bearing 40 therearound such that the bearing 40 enables movement between the spindle 36 and the cylinder 38. The bearing 40 is positioned within the lower end 48 of the cylinder 38. Lubricant (e.g., grease) introduced via a zerk lubricates the interface between the bearing 40 and the lower end 48. Illustratively, the bearing 40 is a plain bearing. In other embodiments, the bearing 40 may be a spherical bearing.

The snap ring 42 is attached to the spindle 36. The snap ring 42 is positioned in a groove 49 included in a radially outer surface 50 of the spindle 36.

The bearing retainer 44 is positioned on the spindle 36 therearound. The bearing retainer 44 is positioned axially and laterally between the snap ring 42 and the bearing 40 such that the snap ring 42 retains the bearing retainer 44 axially and laterally on the spindle 36 and the bearing retainer 44 retains the bearing 40 axially and laterally on the spindle 36. As such, the bearing retainer 44 is positioned axially and laterally between the groove 49 and the bearing 40. The cylinder 38 comprises a barrel 51 from which the cylinder necks down towards the bearing 40 to define a neckdown region 52 in which the bearing retainer 44 is positioned. The snap ring 42 is not sensitive to torque/preload specifications that a bolted joint requires to retain the bearing 40 and lift cylinder 38, promoting a robust design.

The bearing 40 is positioned axially and laterally between the bearing retainer 44 and a collar 53 of the lift apparatus 16. The collar 53 is positioned on the spindle 36 therearound. The bearing 40 is sandwiched axially and laterally between the bearing retainer 44 and the collar 53.

Extensions 54 of the bearing 40 extend axially and laterally outside an end ring 56 of the lower end 48 of the cylinder 38 in which the bearing 40 is positioned. The first extension 54 contacts the collar 53, and the second extension 54 contacts the bearing retainer 44.

Figure 6:
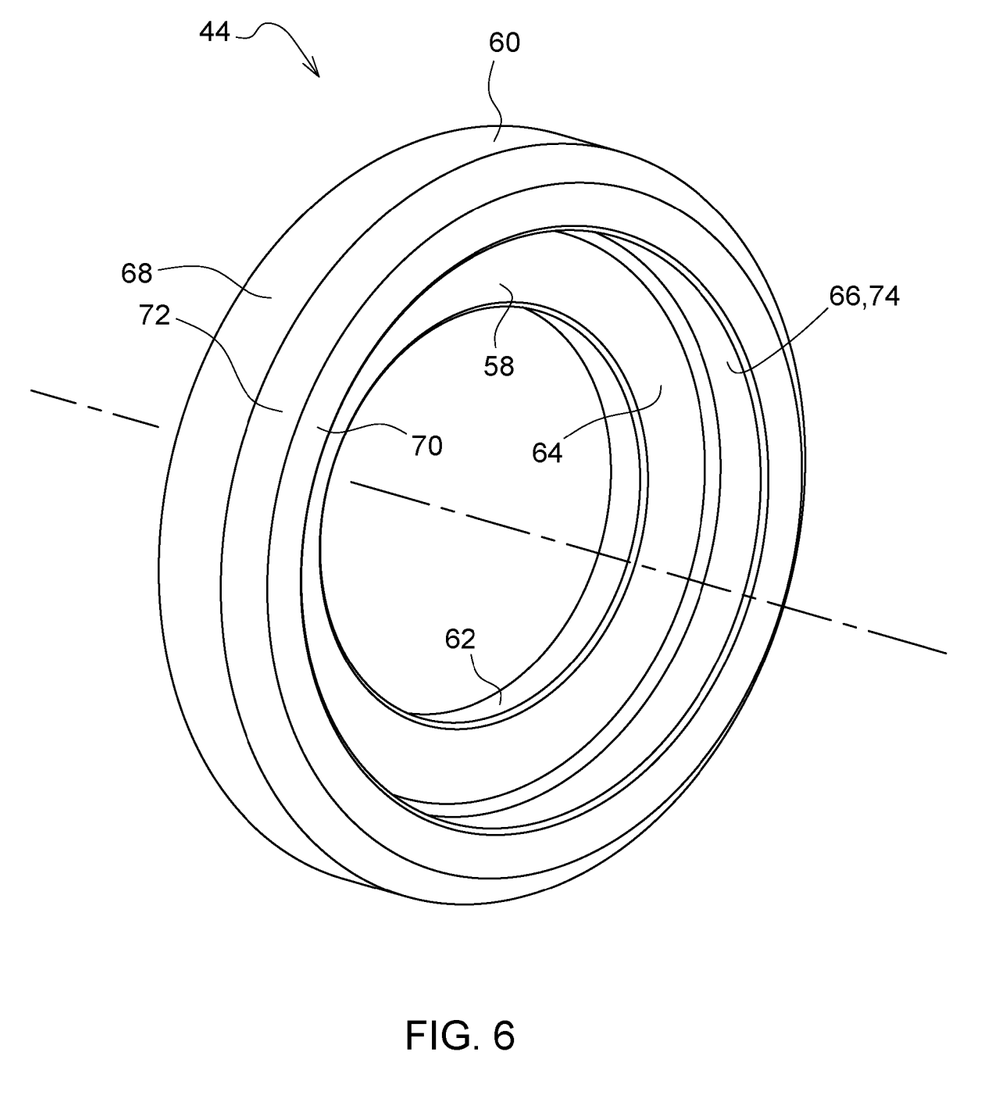
FIG. 6 is a perspective view of the bearing retainer.

Referring to FIG. 6, the bearing retainer 44 comprises an annular disk 58 and a rim 60. The spindle 36 extends axially and laterally through the disk 58. The bearing retainer 44 comprises a through-hole 62 in which the spindle 36 is positioned. The snap ring 42 is nested in the bearing retainer 44, to try to prevent the snap ring 42 from unintentional removal or damage from debris commonly occurring in field conditions. The bearing retainer 44 comprises an annular recess 64, and the snap ring 42 is positioned in the recess 64. The disk 58 and the rim 60 cooperate to provide the recess 64. The recess 64 faces away from the bearing 40 and towards the snap ring 42. The recess 64 faces axially and laterally away from the second frame 34 toward the first frame 32.

The rim 60 comprises a radially inner surface 66, a radially outer surface 68, an end surface 70, and a chamfer 72. The radially inner surface 66 at least partially defines a radially outer periphery 74 of the recess 64 surrounding the snap ring 42. The recess 64 extends radially from the through-hole 62 to the radially outer periphery 74. The radially outer surface 68 faces radially outwardly and extends axially and laterally. The end surface 70 faces axially and laterally inwardly. The chamfer 72 tapers radially inwardly as the chamfer 72 extends axially and laterally inwardly from the radially outer surface 68 to the end surface 70. The end surface 70 extends radially inwardly from the chamfer 72 to the radially inner surface 66 that at least partially defines the radially outer periphery 74 of the recess 64. The end surface 70 of the rim 60 is aligned axially and laterally with an end surface 76 of the spindle 36. The end surfaces 70, 76 are spaced laterally apart from the first frame 32 by the lateral clearance gap 43. The chamfer 72 may help to reduce the impact of a glancing blow from debris between the spindle 36 and the first frame 32. The chamfer 72 may also help to reduce the impact from contact with the first frame 32 due to deflection of the second frame 34 during operation in severe conditions.

Components of the lift apparatus 16 may be hardened through heat treatment. In an example, the spindle 36 may be differentially hardened. As such, the spindle 36 may be through-hardened over its entire span for core strength, and may be surface hardened in an axial zone corresponding to the axial length of the bearing 40 for wear to allow for the locational clearance fit between the bearing 40 and the spindle 36. The bearing retainer 44 and the collar 53 may be through-hardened. The through-hardening of the spindle 36, the bearing retainer 44, and the collar 53 may be a quench and temper process (e.g., John Deere Standard JDV2 HT40T), and the surface hardening of the spindle 36 may be induction hardening (e.g., John Deere Standard JDV2 HT30T).

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A lift apparatus for use with a vehicle comprising a first frame and a second frame, the lift apparatus comprising:

a spindle configured to be attached to the second frame so as to extend therefrom in spaced apart relation to the first frame, a bearing positioned on the spindle, a cylinder configured to be attached to the first frame and attached to the second frame to raise and lower the first frame relative to the second frame, the cylinder positioned on the bearing such that the bearing enables movement between the spindle and the cylinder, a snap ring attached to the spindle, and a bearing retainer positioned on the spindle between the snap ring and the bearing such that the snap ring retains the bearing retainer on the spindle and the bearing retainer retains the bearing on the spindle, the snap ring nested in the bearing retainer, wherein the bearing retainer comprises a rim surrounding and spaced radially apart from the snap ring.

2. The lift apparatus of claim 1, wherein the bearing retainer comprises an annular disk through which the spindle extends.

3. The lift apparatus of claim 1, wherein the bearing retainer comprises an annular recess facing away from the bearing, and the snap ring is positioned in the recess.

4. The lift apparatus of claim 3, wherein the rim comprises a radially inner surface at least partially defining a radially outer periphery of the recess surrounding the snap ring.

5. The lift apparatus of claim 4, wherein the bearing retainer comprises a through-hole in which the spindle is positioned, and the recess extends radially from the through-hole to the radially outer periphery.

6. The lift apparatus of claim 4, wherein the rim comprises a chamfer.

7. The lift apparatus of claim 6, wherein the rim comprises a radially outer surface facing radially outwardly and extending axially and an end surface facing axially, and the chamfer tapers radially inwardly as the chamfer extends axially from the radially outer surface to the end surface.

8. The lift apparatus of claim 7, wherein the end surface extends radially inwardly from the chamfer to the radially inner surface.

9. The lift apparatus of claim 8, wherein the end surface of the rim is aligned axially with an end surface of the spindle.

10. The lift apparatus of claim 1, wherein the bearing retainer comprises a chamfer.

11. The lift apparatus of claim 1, wherein the cylinder comprises a barrel from which the cylinder necks down towards the bearing to define a neckdown region in which the bearing retainer is positioned.

12. The lift apparatus of claim 1, wherein the spindle comprises a groove in an outer surface of the spindle, the snap ring is positioned in the groove, and the bearing retainer is positioned between the groove and the bearing.

13. A vehicle comprising the lift apparatus of claim 1, wherein the first frame is a main frame and the second frame is a track frame such that the vehicle comprises the main frame and the track frame which is attached to the main frame, the spindle is mounted to the track frame and extends laterally therefrom in spaced apart relation to the main frame, the bearing retainer comprises an annular recess facing laterally away from the track frame toward the main frame, and the snap ring is positioned in the recess.

14. The vehicle of claim 13, wherein the rim defines a radially outer periphery of the recess.

15. The vehicle of claim 14, wherein the rim comprises a chamfer.

16. A lift apparatus for use with a vehicle comprising a first frame and a second frame, the lift apparatus comprising:

a spindle configured to be attached to the second frame so as to extend therefrom in spaced apart relation to the first frame, a bearing positioned on the spindle, a cylinder configured to be attached to the first frame and attached to the second frame to raise and lower the first frame relative to the second frame, the cylinder positioned on the bearing such that the bearing enables movement between the spindle and the cylinder, a snap ring attached to the spindle, and a bearing retainer positioned on the spindle between the snap ring and the bearing such that the snap ring retains the bearing retainer on the spindle and the bearing retainer retains the bearing on the spindle, the snap ring nested in the bearing retainer, and a collar positioned on the spindle therearound, wherein the bearing is positioned between the collar and the bearing retainer.

17. A lift apparatus for use with a vehicle comprising a first frame and a second frame, the lift apparatus comprising:

a spindle configured to be attached to the second frame so as to extend therefrom in spaced apart relation to the first frame, a bearing positioned on the spindle, a cylinder configured to be attached to the first frame and attached to the second frame to raise and lower the first frame relative to the second frame, the cylinder positioned on the bearing such that the bearing enables movement between the spindle and the cylinder, a snap ring attached to the spindle, and a bearing retainer positioned on the spindle between the snap ring and the bearing such that the snap ring retains the bearing retainer on the spindle and the bearing retainer retains the bearing on the spindle, the snap ring nested in the bearing retainer, wherein the bearing retainer comprises an annular recess facing away from the bearing, and the snap ring is positioned in the recess, the bearing retainer comprises a rim, and the rim comprises a radially inner surface at least partially defining a radially outer periphery of the recess surrounding the snap ring, a radially outer surface facing radially outwardly and extending axially, and an end surface facing axially and aligned axially with an end surface of the spindle.

* * * * *